(12) United States Patent
Fradette

(10) Patent No.: US 6,606,698 B2
(45) Date of Patent: Aug. 12, 2003

(54) APPARATUS AND METHOD FOR MANAGING DATA STORAGE

(75) Inventor: Robert J. Fradette, Orleans (CA)

(73) Assignee: StorageQuest Inc., Carp (CA)

( * ) Notice: Subject to any disclaimer, the term of this patent is extended or adjusted under 35 U.S.C. 154(b) by 0 days.

(21) Appl. No.: 09/413,185

(22) Filed: Oct. 5, 1999

(65) Prior Publication Data

US 2001/0052061 A1 Dec. 13, 2001

(51) Int. Cl.[7] .............................................. G06F 12/00
(52) U.S. Cl. ........................ 711/209; 711/118; 711/202
(58) Field of Search ................................ 711/118, 202, 711/209

(56) References Cited

U.S. PATENT DOCUMENTS

| | | | |
|---|---|---|---|
| 5,007,017 A | 4/1991 | Kobayashi | 364/900 |
| 5,166,686 A * | 11/1992 | Sugiyama | 341/118 |
| 5,175,817 A | 12/1992 | Adams et al. | 395/200 |
| 5,191,653 A | 3/1993 | Banks et al. | 395/275 |
| 5,446,868 A | 8/1995 | Gardea, II et al. | 395/500 |
| 5,471,634 A | 11/1995 | Giorgio et al. | 395/600 |
| 5,491,812 A | 2/1996 | Pisello et al. | 395/500 |
| 5,499,378 A | 3/1996 | McNeill, Jr. et al. | 395/500 |
| 5,537,626 A | 7/1996 | Kraslavsky et al. | 395/828 |
| 5,577,207 A | 11/1996 | Pauget et al. | 395/200.02 |
| 5,598,538 A | 1/1997 | Cooper | 395/281 |
| 5,611,053 A | 3/1997 | Wu et al. | 395/280 |
| 5,613,160 A | 3/1997 | Kraslavsky et al. | 395/836 |
| 5,642,337 A | 6/1997 | Oskay et al. | 369/30 |
| 5,652,839 A | 7/1997 | Giorgio et al. | 395/200.11 |
| 5,682,483 A | 10/1997 | Wu et al. | 395/281 |
| 5,717,855 A | 2/1998 | Norman et al. | 395/200 |
| 5,721,880 A | 2/1998 | McNeill, Jr. et al. | 395/500 |
| 5,748,924 A | 5/1998 | Llorens et al. | 395/309 |
| 5,751,975 A | 5/1998 | Gillespie et al. | 395/306 |
| 5,859,972 A | 1/1999 | Subramaniam et al. | 395/200.33 |
| 5,896,383 A | 4/1999 | Wakeland | 370/400 |
| 5,907,678 A * | 5/1999 | Housel, III et al. | 709/213 |
| 5,938,752 A | 8/1999 | Leung et al. | 710/126 |
| 6,061,714 A * | 5/2000 | Housel, III et al. | 709/203 |
| 6,160,992 A * | 12/2000 | Laham et al. | 455/11.1 |
| 6,185,556 B1 * | 2/2001 | Snodgrass et al. | 707/102 |
| 6,272,129 B1 * | 8/2001 | Dynarski et al. | 370/356 |

FOREIGN PATENT DOCUMENTS

| WO | WO97/11426 | 3/1997 |
|---|---|---|

OTHER PUBLICATIONS

Plasmon, NetReady Solution, May 1998.
NetReady, Network Attached Storage, no date.

* cited by examiner

*Primary Examiner*—Reba I. Elmore

(57) ABSTRACT

A data storage managing apparatus is described which translates a host Input/Output (I/O) request into a standard form. Thus, I/O requests sent by different hosts using different protocols are treated in the same manner for accessing the data storage. The I/O request in the standard form is then normalized by adding a storage address. The normalized request is routed based on the storage address. Therefore, the present invention enables transparent communication between various types of hosts and various types of storage devices.

33 Claims, 8 Drawing Sheets

APPARATUS AND METHOD FOR MANAGING DATA STORAGE

This invention relates to a data storage managing apparatus and a method for managing data storage, and more particularly, to a data storage managing apparatus and a method for managing data storage having high capacity.

BACKGROUND OF THE INVENTION

In the data storage industry, a large amount of data is needed to be stored for fast access on computer systems and archived for historic reference. Large storage systems are required to contain historical records and current data. The data stored in such large storage systems is in turn accessed and analyzed continually for new information. The timeliness to retrieve and deliver the information is important for productivity. Multiple sources of data may need to be accessed in multiple locations.

There exist different forms of large storage, such as tape silos and optical jukeboxes. Existing large storage products provided from large data storage suppliers are often limited by their requirements to use proprietary software management systems. Those proprietary systems require selected server processors and operating systems. The support of these few systems limits the availability of processors supported and timely availability for new storage equipment. Some vendors only support popular operating systems for the applications that require storage. As well, the applications written for various proprietary systems developed by each vendor have highly variable software quality. They do not support many more specialized processor systems.

Conventionally, storage systems are attached directly to server processors that contain the user application. FIG. 1 shows typical steps taken by a conventional data storage managing device. First, the device receives a request (2), and then accesses the data storage (4) to which the device is connected.

For example, U.S. Pat. No. 5,642,337 issued to Oskay et al on Jun. 24, 1997 discloses a storage system with optical mass storage devices. The storage system is connected to a network of magneto-optical disk jukeboxes which operates on Small Computer System Interface (SCSI) commands. A network server receives SCSI format commands, encodes them to the network format, and places the commands on the network bus. Thus, the storage system is intercoupled on the network to provide a virtually limitless mass storage system. However, this system is limited to use of SCSI format commands and the specific network format. Only SCSI request commands may be used. The network server simply translates the SCSI commands into the request in the storage network format directly. The network can only to be comprised of only the same type of the jukeboxes. If this system were to be used with a different type of format, the whole system would need to be redesigned.

It is therefore desirable to provide a data storage managing system which can operate with many different computing systems and also support many different data storage devices.

SUMMARY OF THE INVENTION

The present invention translates a host Input/Output (I/O) request into a standard form. Thus, I/O requests sent by different hosts using different protocols are treated in the same manner for accessing the data storage. The I/O request in the standard form is then normalized by adding a storage address. The normalized request is routed based on the storage address. Therefore, the present invention enables transparent communication between various types of hosts and various types of storage devices.

In accordance with an aspect of the present invention, there is provided a data storage managing apparatus for managing data storage. The data storage managing apparatus comprises a request processing unit, a normalizer, a router and an access unit. The request processing unit is provided for receiving an Input/Output (I/O) request using a local protocol, and translating the I/O request into a translated request in an internal protocol. The normalizer has a storage address generator for generating a storage address and adding the storage address to the translated request to generate a normalized request. The router is provided for routing the normalized request based on the storage address. The access unit is provided for accessing one of the storage devices based on the storage address.

In accordance with another aspect of the present invention, there is provided a method for managing data storage. The method comprises the steps of receiving an Input/Output (I/O) request for writing or reading data to or from the data storage, the I/O request being received using a local protocol; translating the I/O request into a translated I/O request within an internal protocol; normalizing the translated request by adding a storage address to output a normalized request; routing the normalized request based on the storage address; and accessing the data storage based on the storage address.

Other aspects and features of the present invention will be readily apparent to those skilled in the art from a review of the following detailed description of preferred embodiments in conjunction with the accompanying drawings.

BRIEF DESCRIPTION OF THE DRAWINGS

The invention will be further understood from the following description with reference to the drawings in which.

DETAILED DESCRIPTION OF THE PREFERRED EMBODIMENTS

Figure 1:
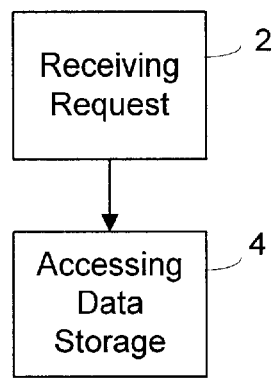
FIG. 1 is a flowchart showing data access steps in the prior art.
Figure 2:
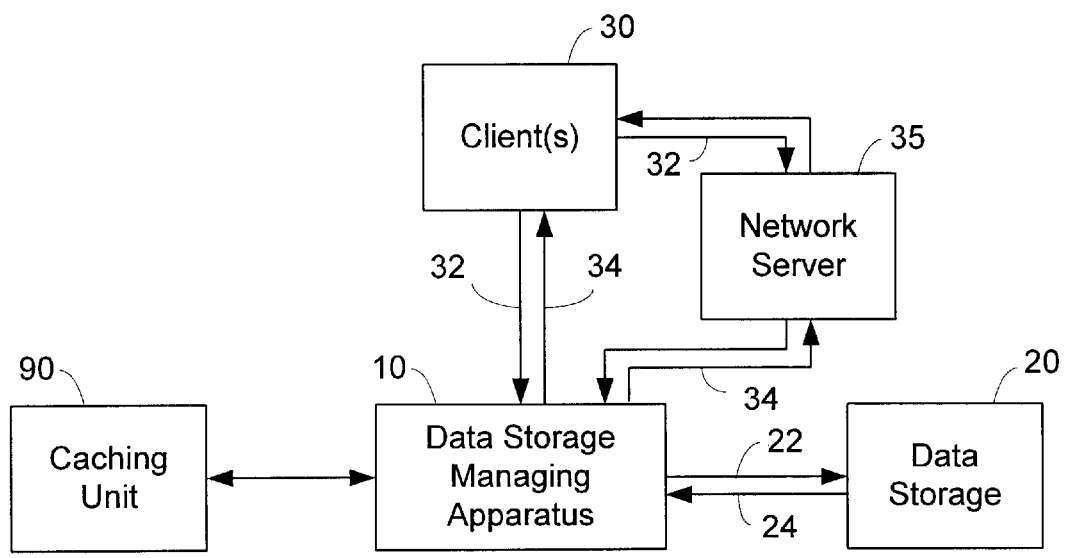
FIG. 2 is a block diagram showing use of a data storage managing apparatus in accordance with the present invention.

FIG. 2 shows an embodiment of the data storage managing apparatus 10 in accordance with the present invention. The data storage managing apparatus 10 is located between data storage 20 and one or more clients 30.

The data storage 20 stores data including text, images, sound and video. The data storage 20 has high capacity, and typically has a plurality of storage devices. The data storage 20 may include multiple storage devices of the same type or of different types.

The clients 30 may use any type of operating system. Each operating system uses its local protocol to communicate with the data storage managing apparatus 10. The clients 30 may communicate with the data storage managing apparatus 10 directly or through a network server 35.

The data storage managing apparatus 10 provides an integrated suite of storage connectivity solutions for transparent interconnection between the clients 30 using various operating systems and data storage 20 having various storage devices. It presents to the clients 30 the various storage devices of the data storage 20 like a single virtual disk image or multiple virtual disk images. It may present the various storage devices of the data storage 20 like a single virtual database image or multiple virtual database images, depending on the protocol used.

When a client 30 wants to write or read data to or from the data storage 20, the client sends an Input/Output (I/O) request 32 to the data storage managing apparatus 10 directly or via the network server 35. In response to the I/O request, the data storage managing apparatus 10 accesses the data storage 20 to write data 22 or read data 24. The retrieved data 34 is sent to the client 30 directly or via the network server 35. The client 30 and the network server 35 do not require any proprietary software to access the data storage 20, via the data storage managing apparatus 10.

In order to enhance its performance, it is preferable that the data storage managing apparatus 10 uses a caching unit 90 for caching data that is being written or read.

Figure 3:
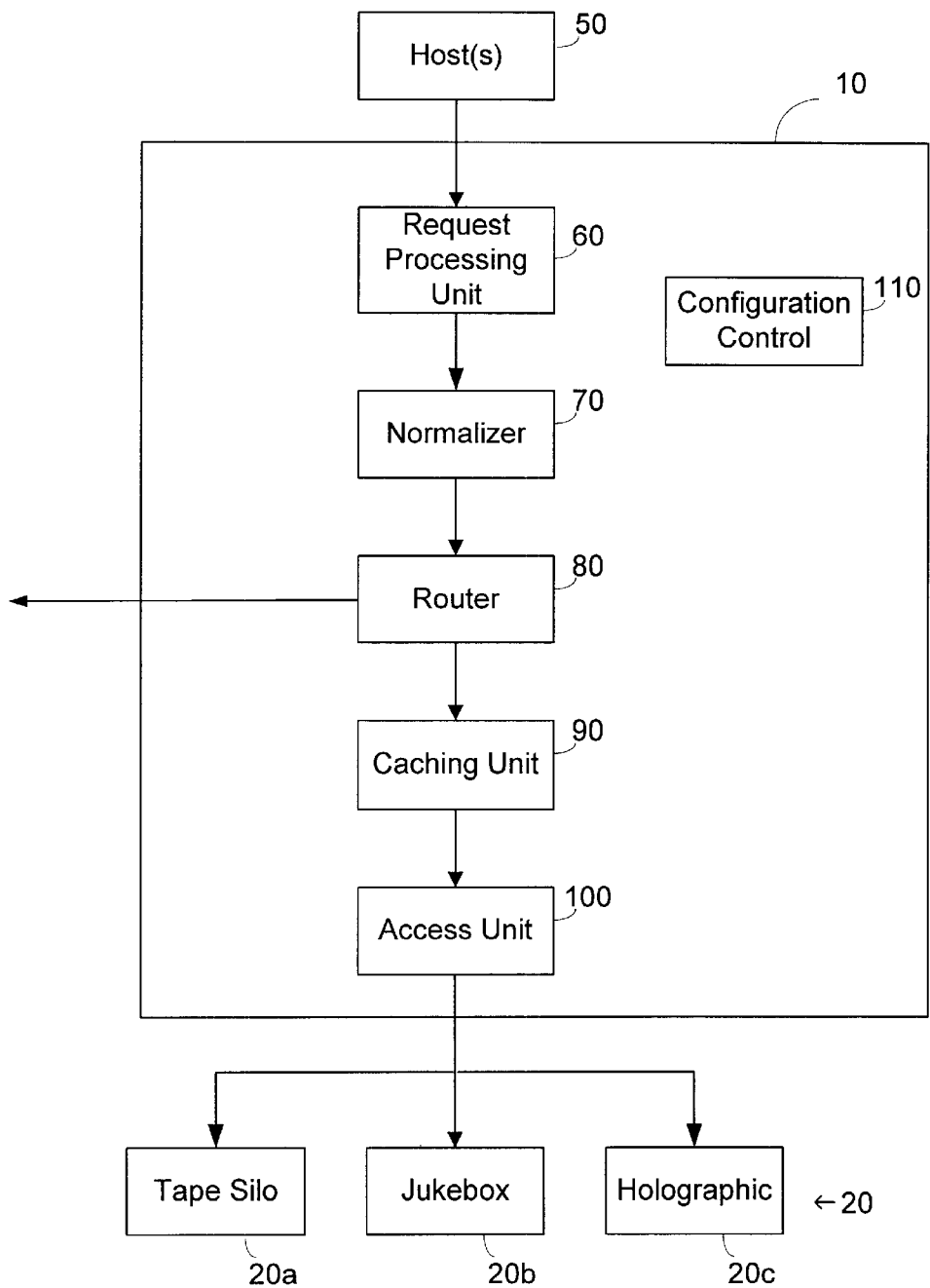
FIG. 3 is a block diagram showing an embodiment of a data storage managing apparatus in accordance with the present invention.

FIG. 3 shows an embodiment of the data storage managing apparatus 10. The apparatus 10 comprises a request processing unit 60, a normalizer 70, a router 80, a caching unit 90 and an access unit 100.

The data storage managing apparatus 10 communicates with hosts 50, i.e., clients 30 directly or via network servers 35. Each host 50 sends host requests using its host protocol. Host requests may include I/O requests, information requests and configuration requests.

Figure 4:
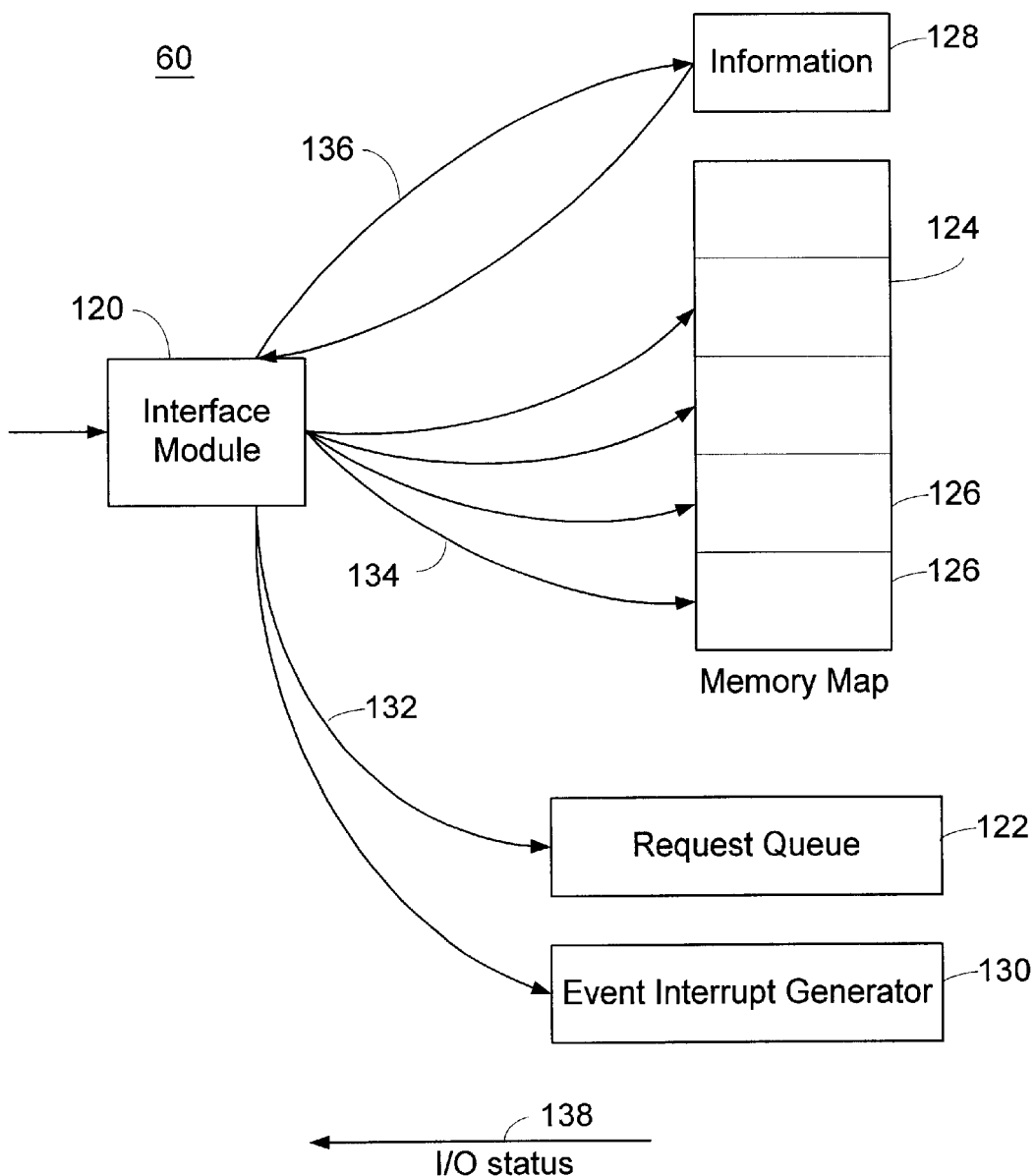
FIG. 4 is a schematic diagram showing an example of the request processing unit shown in FIG. 3.

The request processing unit 60 interfaces communication with the hosts 50. FIG. 4 shows an example of the request processing unit 60. The request processing unit 60 comprises one or more interface modules 120, a request queue 122 and a memory map 124.

Each interface module 120 is specifically tailored for each host protocol. Normally, each host protocol is based on some form of physical hardware card, e.g., a network card for a network based protocol, and a SCSI card for a SCSI direct attached hardware interface. Each interface module 120 communicates with its respective card. If a new host protocol, e.g., Fibre Channel, is introduced, a new interface module 120, e.g., Fibre Channel module, is added to the request processing unit 60 to support the new host protocol.

Each interface module 120 has a separating function for separating host requests depending on the request types. It also has an internal command generating function for generating an internal command in response to the receipt of a host I/O request. The internal command is tagged with a logical address which is defined by the host protocol. A logical address indicates where the data is. It has the same format across different storage devices. Most storage devices support both logical and physical addresses. The interface module 120 generates a logical address for a host request based on the original address or file name of the host request. These functions are further described in detail later.

The request queue 122 is provided for temporarily storing internal commands generated by the interface modules 120. The request queue 122 may also temporarily store, together with the commands, information regarding the memory region where their corresponding data is stored.

The memory map 124 has a plurality of memory regions 126 for temporarily storing data to be written. Each memory region 126 is assigned to its respective interface module 120.

In each memory region 126, pre-allocated buffers (not shown) are provided. Each buffer is assigned with an identification number. Using this identification number, the internal commands generated by the interface modules 120 for input requests may be tagged with the information regarding the buffers where their corresponding data is stored.

The memory map 124 may also have a region 128 for storing information, e.g., static attribute information or configuration information of the data storage managing apparatus 10.

Also, it is preferable that the request processing unit 60 has an event interrupt generator 130 for generating signals or event interrupts to notify other elements of the data storage managing apparatus 10 when specific events occur in the request processing unit 60.

Figure 5:
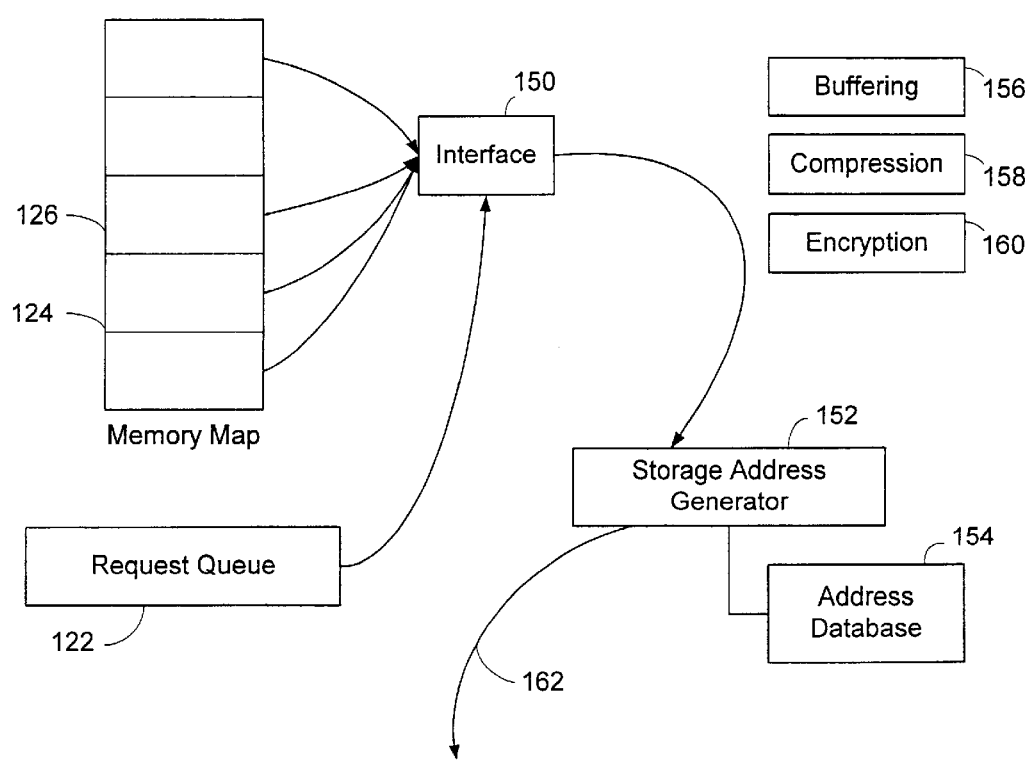
FIG. 5 is a schematic diagram showing an example of the normalizer shown in FIG. 3.

The request processing unit 60 is connected to the normalizer 70. FIG. 5 shows an example of the normalizer 70. The normalizer 70 has an interface 150, a storage address generator 152 and an address database 154.

The interface 150 reads the commands from the request queue 122 of the request processing unit 60. When the commands indicate write operation, the interface 150 also reads the corresponding data from the memory map 124 of the request processing unit 60.

The storage address generator 152 generates storage addresses and adds them to the commands. The generated storage addresses are stored in the address database 154 together with relevant information, e.g., the logical addresses that are tagged on the commands. The storage address generator 152 also retrieves storage addresses stored in the address database 154.

The storage addresses may be generated by normalizing the logical addresses. The normalized logical address relates to logical and physical addresses, file names, object names and network addresses. When data is sent to or stored in more than one data location, a storage address indicates those data locations. In order to access data from an external system, a logical address of the system or a "data location" may be prefixed with a system ID.

The output of the storage address generator 152 is normalized requests 162 having the storage addresses.

The storage address generator 152 may also have a component to refer to data that is outside the data storage managing apparatus 10.

The normalizer 70 may also have one or more components that modify the data to optimize it for storing. For example, the normalizer 70 may include a buffering component 156, a compression component 158 and/or an encryption component 160.

The buffering component 156 buffers data. This component 156 may be used to consolidate multiple requests into one coherent larger request, as described later.

The compression component 158 compresses data for writing, and uncompresses data for reading. The compression component 158 may have a number of different compression algorithms that can be applied to compress or uncompress the data.

The encryption component 160 encrypts data for writing and decrypts data for reading. This component 160 may be used for security of data.

Figure 6:
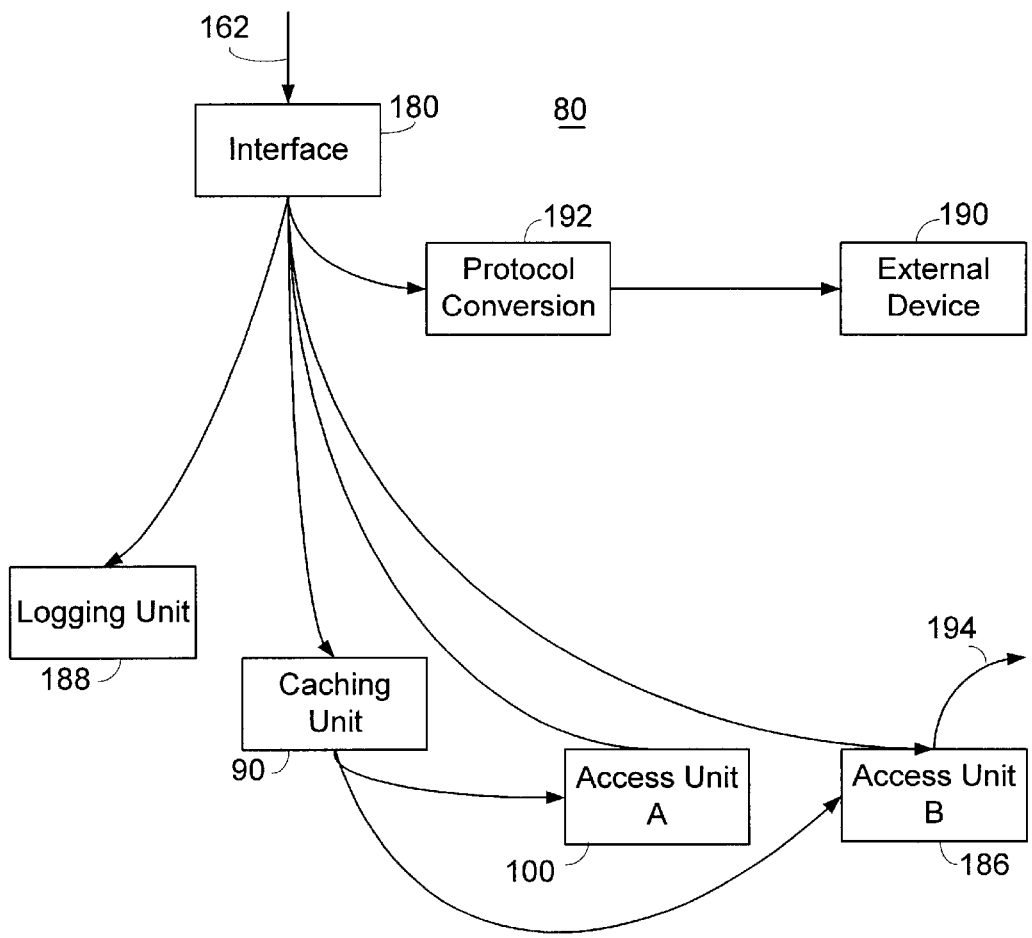
FIG. 6 is a schematic diagram showing an example of the router shown in FIG. 3.

The normalizer 70 is connected to the router 80. The main function of the router 80 is to determine the destination of the normalized commands 162, i.e., where the data should go or where the data should come from. As shown in FIG. 6, the router 80 has an interface 180 to receive the normalized requests 162 from the normalizer 70. The router 80 is connected to a plurality of devices, e.g., the caching unit 90, the multiple access device A 100, a multiple access device B 186 of other data storage managing apparatus or apparatuses, a logging unit 188 and an external system 190.

The router 80 may have a protocol conversion 192 for converting protocols to a local network protocol in order to route the data to an external system 190.

The router 80 also has the ability to send or to write data to more than one location.

The caching unit 90 is provided in this embodiment to enhance the performance of the data storage managing apparatus 10. However, the data storage managing apparatus 10 may not use any caching unit. In FIG. 5, the caching unit 90 is provided within the data storage managing apparatus 10. It may be provided separately from the data storage managing apparatus 10 as shown in FIG. 2.

Figure 7A:
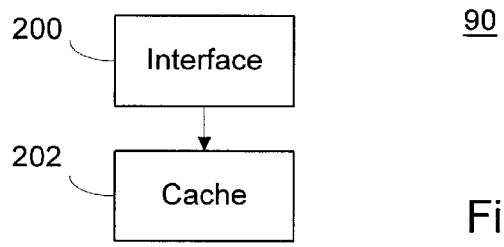
FIG. 7A is a block diagram showing an example of the caching unit.

As shown in FIG. 7A, the caching unit 90 has an interface 200 for receiving normalized requests from the router 80 and a cache 202.

It is preferable that the caching unit 90 has more than one cache 202 to provide one cache 202 for each storage device of the data storage 20.

The access unit 100 is connected to the caching unit 90 and directly to the router 80. The access unit 100 interfaces communication with the data storage 20, e.g., a tape silo 20*a*, jukebox 20*b* and/or holographic storage 20*c*.

Figure 8:
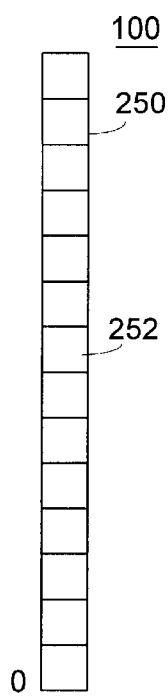
FIG. 8 is a schematic diagram showing an example of the access unit shown in FIG. 3.

As shown in FIG. 8, the access unit 100 configures all storage devices of the data storage 20 as a block of linear storage represented by the block count 250. That is, the storage addresses in the data storage 20 start at an address 0 up to an amount corresponding to its maximum capacity. Each block in the block counter 250 corresponds to each storage device, and has a unique storage address. Thus, the access unit 100 provides a level of abstraction. It hides details of each storage device, e.g., block sizes, and makes the stored data consistent.

The data storage managing apparatus 10 also includes a configuration control 110 for configuring the data storage managing apparatus 10.

Figure 9:
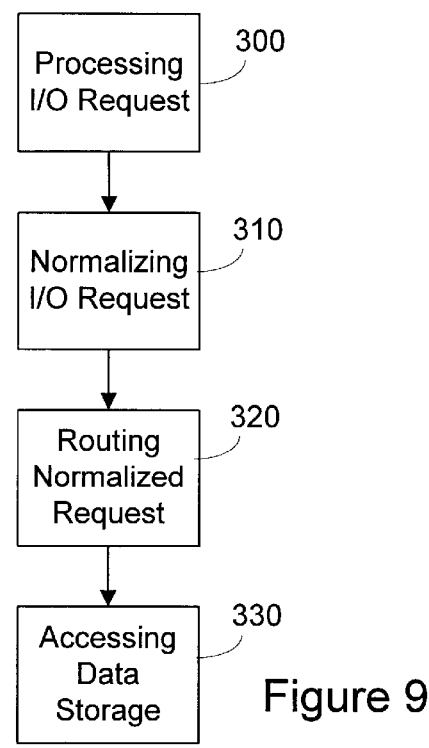
FIG. 9 is a flowchart showing the operation of the data storage managing apparatus shown in FIG. 3.

In operation, as shown in FIGS. 9 and 3, the data storage managing apparatus 10 takes main four steps when an I/O request is received from a host 50. The data storage managing apparatus 10 processes the I/O request using the request processing unit 60 (300). The request processing unit 60 translates the I/O request sent in the host protocol into an internal protocol of the data storage managing apparatus 10. Thus, the differences between the local host protocols used by different hosts 50 are shielded, and the data storage managing apparatus 10 can carry out the rest of the steps in a standard way for all I/O requests.

Then, the data storage managing apparatus 10 normalizes the I/O request using the normalizer 70 (310) by generating a storage address. The normalizer 70 outputs a normalized request having the storage address.

The normalized request is routed by the router 80 (320) based on the storage address. If the storage address is one of the data storage 20 to which the data storage managing apparatus 10 is attached, the router 80 routes the normalized request to the access unit 100 directly or via the caching unit 90. The router 80 may redirect the I/O request to other apparatus or apparatuses depending on the storage address.

The data storage managing apparatus 10 then accesses the data storage 20 using the access unit 100 (330) to write or read data.

Each step is described in detail, using the write operation and the read operation.

Writing Operation

Figure 10:
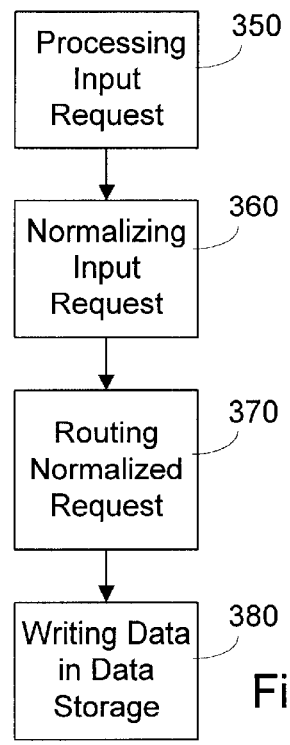
FIG. 10 is a flowchart showing the write operation of the data storage managing apparatus shown in FIG. 3.

FIG. 10 shows the writing operation. The data storage managing apparatus 10 receives from a host 50 an input request for writing data in a storage device (350). The input request is sent using the host protocol.

As shown in FIG. 4, the host 50 is connected to an interface module 120 that handles the host protocol. The request processing unit 60 receives the input request using the interface module 120. It translates the input request into the internal protocol of the data storage managing apparatus 10 by mapping the input request to the memory map 124.

In the input request of the host protocol, there is usually a command component and a data component. The interface module 120 responds to the host protocol, and splits the input request into the command component and the data component.

The interface module 120 generates an internal command 132 based on the command component of the input request. The internal command 132 is used by the data storage managing apparatus 10. The interface module 120 tags the internal command 132 with a logical address which is defined by the host protocol. The interface module 120 sends the internal command 132 into the request queue 122.

The interface module 120 also sends the data 134 in the data component of the input request into the next available memory buffer in the memory region 126 that is preallocated to the interface module 120. The information regarding the memory mapped region 126 is preferably stored with the corresponding command in the request queue 122.

The request processing unit 60 may also generate a sequence number for every occurrence of data that is moved from the host 50 to a memory region 126 to identify each input request as unique. Thus, each request may be tagged in the request queue 122 and in the memory map 124. Tagging may also be used for time stamping of requests.

Once the mapping of the input request is done, the request processing unit 60 may generate an event interrupt by the event interrupt generator 130 to inform the other components of the data storage managing apparatus 10 that a new request is available in the request queue 122.

When a large input request is generated, the host protocol often breaks down such a large input request into a number of smaller messages. In this case, the request processing unit 60 may place the data 134 of the small messages in consecutive memory buffers in the memory region 126, and generate only one internal command 132 for the large input request. It may also generate only one event interrupt. By treating the small messages as a single request, the performance of the large data transfer may be enhanced.

There may be a number of memory regions 126 that are mapped together. This allows a single host 50 to request a number of writes together.

As described above, the request processing unit 60 may have a plurality of various interface modules 120, each handling its corresponding protocol. Thus, the request processing unit 60 may handle various protocols at the same time. For example, a network request and a SCSI request may come into the data storage managing apparatus 10 at the same time. These requests are mapped to different regions 126 of the memory map 124 as each memory region 126 is assigned to a separate interface module 120, as described above.

Figure 12:
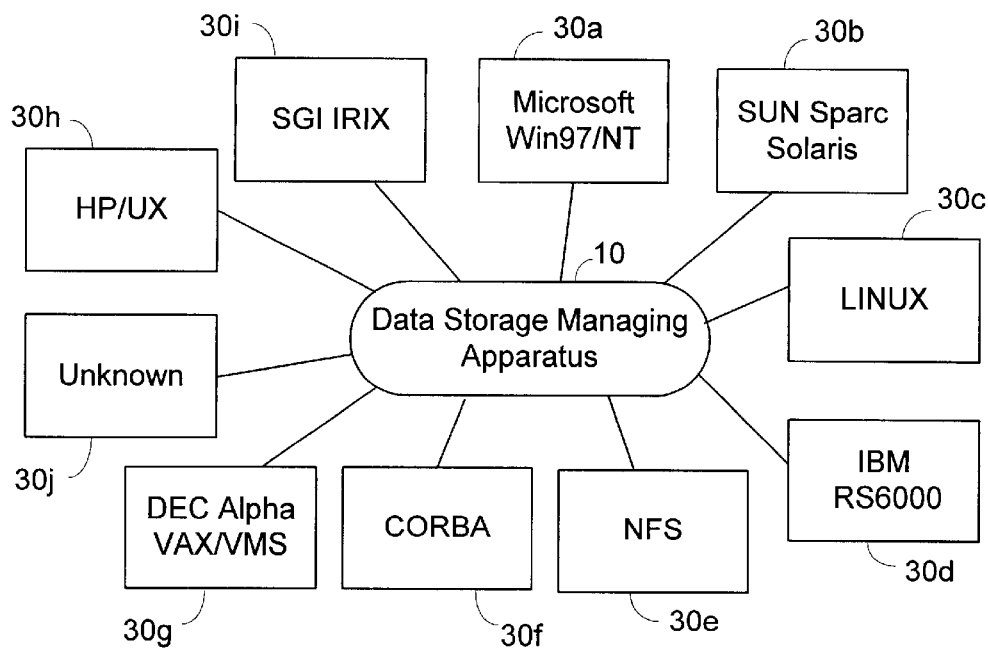
FIG. 12 is a schematic diagram showing operating system connectivity of the data storage managing apparatus shown in FIG. 3.

Therefore, the data storage managing apparatus 10 can communicate with many different hosts 50 using various operating systems. FIG. 12 shows an example of the operating system connectivity of the data storage managing apparatus 10. Examples of operating systems that the hosts 50 can use to communicate with the data storage managing apparatus 10 include Microsoft Win97/NT 30*a*, SUN Sparc Solaris 30*b*, Linux 30*c*, IBM RS6000 30*d*, NFS 30*e*, CORBA 30*f*, DEC Alpha VAX/VMS 30*g*, HP/UX 30*h* and SGI IRIX 30*i*. The box "unknown" 30*j* represents any other operating system.

The next step of the writing operation is normalizing the mapped input request (360), as shown in FIG. 10.

As shown in FIG. 5, the normalizer 70, using its interface 150, checks the request queue 122 and reads the next available command. The normalizer 70 may check the request queue 122 upon generation of an event interrupt by the request processing unit 60.

The command for writing in the request queue 122 is tagged with the information regarding the memory mapped region 126. Thus, the normalizer 70 also reads the data stored in the memory mapped region 126.

The normalizer 70 generates a storage address using the storage address generator 152. The storage address indicates a specific location in a specific storage device where the data should be written. The generated storage address is stored in the address database 154 together with relevant information, e.g., the logical address tagged on the command.

Once the storage address is generated, the normalizer 70 generates a normalized request 162 having the storage address. The normalized request 162 is sent to the router 80.

The normalizer 70 may optionally modify the data. For example, there are two consecutive write requests, both having data that can be contiguous. In this case, the normalizer 70 may automatically combine those two requests to make one request, by buffering the data from the two requests in the buffering component 156. The normalizer 70 may compress the data using the compression component 158. It may also encrypt the data using the encryption component 160 for data security.

The next step in the writing operation is routing the normalized request to an appropriate device (370) as shown in FIG. 10.

As shown in FIG. 6, the router 80 determines which data storage unit the normalized request 162 should be sent based on the storage address included in the normalized request 162.

The interface 180 checks if the storage address is internal, i.e., it indicates a storage device of the data storage 20 to which the data storage managing apparatus 10 is attached. If it is not internal, the router 80 sends the.normalized request 162 to an external device 190. Prior to sending the request to the external device 190, the router 80 may carry out appropriate protocol conversion of the request using the protocol converter 192.

It is preferable that the data storage managing apparatus 10 communicates with other data storage managing apparatuses of the same type. When the storage address indicates a storage device of a data storage 20 to which another data storage managing apparatus is attached, the router 80 may send the normalized request 162 directly to the access unit B of the another data storage managing apparatus.

If the storage address is internal, the router 80 may check if the storage device of the storage address is accessible through a caching unit 90. If the storage device is accessible through a caching unit 90, the router 80 sends the normalized request 162 to the caching unit 90. If the storage device is not accessible through a caching unit, the router 80 sends the normalized request 162 directly to the accessing unit 100 through which the storage device is accessible.

The router 80 may send a single normalized request to more than one storage device. For example, the router 80 may send a normalized request concurrently to two access units 100 and 186 of two data storage managing apparatuses to provide "mirroring". When the data is written in a storage device, a backup 194 may also be made in a different storage device based on a single normalized request.

The last step of the writing operation is writing the data in the data storage 20 (380) as shown in FIG. 10. This step may be carried out through the caching unit 90 or directly by the access unit 100.

When the caching unit 90 is available, the router 80 sends the normalized request to it depending on the storage address included in the request.

Figure 7B:
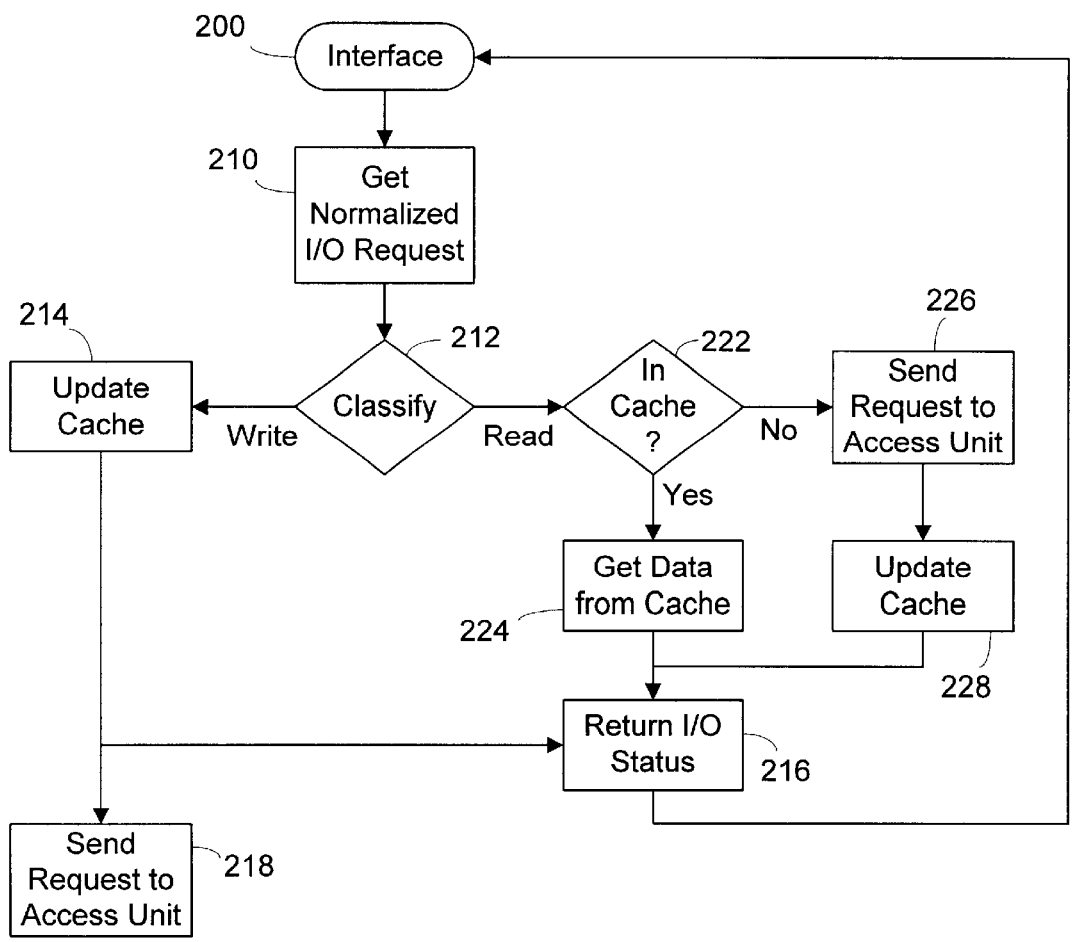
FIG. 7B is a flowchart showing an example of the operation of the caching unit.

As shown in FIG. 7B, the cache interface 200 receives the normalized request (210). It classifies received requests into write requests and read requests (212). The normalized request is a write request in this case. The caching unit 90 updates the cache 202 with the data included in the normalized request (214). Then, it sends I/O status indicating "request complete" to the interface 200 (216). The I/O status 138 may be returned to the host by the request processing unit 60 as shown in FIG. 4.

The caching unit 90 also sends the normalized request to the access unit 100 for writing the data into the storage device having the storage address (218). It is preferable that returning the I/O status (216) is carried out in parallel with sending the normalized request to the access unit 100 (218). Thus, there is a concurrent updating of the cache and writing the storage device.

When the access unit 100 receives the normalized request, as shown in FIG. 8, it accesses a specific block 252 corresponding to the storage address in the normalized request. Thus, the data is written to a specific storage device represented by the block 252. For example, the storage device may be a disk No. X in shelf Y of a jukebox.

Figure 13:
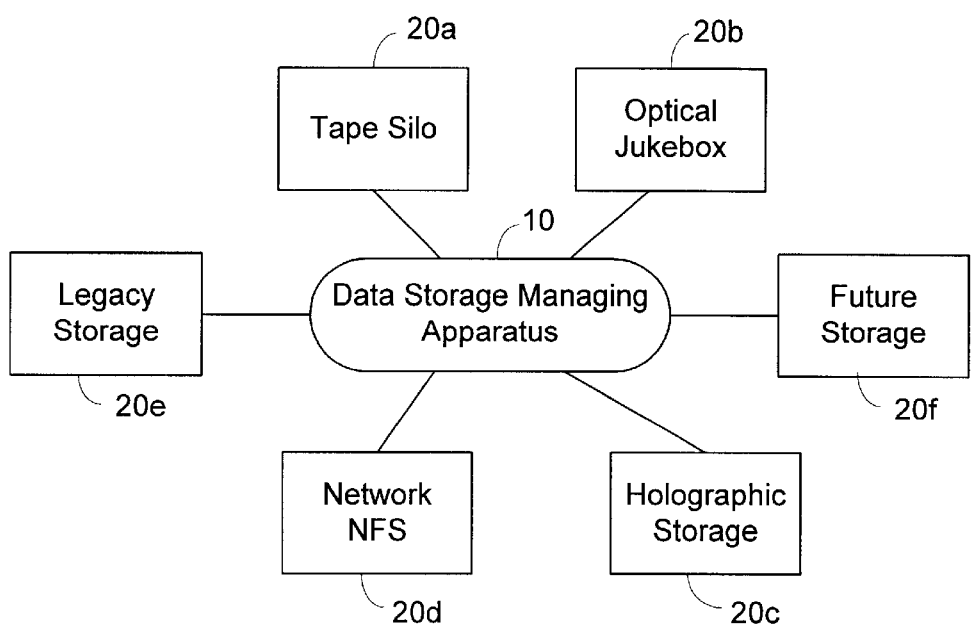
FIG. 13 is a schematic diagram showing storage device connectivity of the data storage managing apparatus shown in FIG. 3.

As the access unit 100 hides details of each storage device, it has the capacity to communicate directly with various forms of storage. FIG. 13 shows an example of the device connectivity of the data storage managing apparatus 10. Examples of data storage 20 with which the data storage managing apparatus 10 can communicate include tape silos 20*a*, optical jukeboxes 20*b*, holographic storage 20*c*, networks 20*d*, legacy storage 20*e* and future storage 20*f*. The tape silos 20*a* are generally large tape libraries.

The networks 20*d* represents disk drives or other data storage exported to or existing in computer networks. A network 20d may use a standard protocol, NFS, CORBA or other network protocols. As shown in FIGS. 12 and 13, NFS is supported by the data storage managing apparatus 10 as both a host 50 and data storage 20. Accordingly, the data storage managing apparatus 10 can make the data storage 20 connected to the data storage managing apparatus 10 look like an NFS volume, and the data storage managing apparatus 10 can read/write another NFS volume.

The legacy storage 20e often uses proprietary custom devices for implementation. The data storage managing apparatus 10 has the ability to communicate with such legacy storage devices 20e natively to make each device look like one or more standard disk drives to the client processors 30.

The future 20f represents that, if a new technology of data storage is implemented, the data storage managing apparatus 10 can communicate with the new data storage by adding a very small module.

Therefore, the data storage managing apparatus 10 is capable of attaching to many different client processors, and also supporting many different storage systems. This removes the large cost of proprietary software systems which are often needed in conventional data storage managing devices. The data storage managing apparatus 10 therefore fits most data storage environments easily and can be expanded inexpensively with evolving needs.

Reading Operation

Figure 11:
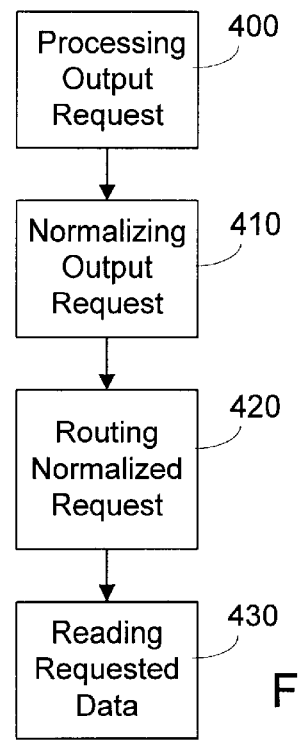
FIG. 11 is a flowchart showing the read operation of the data storage managing apparatus shown in FIG. 3.

FIG. 11 shows the reading operation. The data storage managing apparatus 10 receives from a host 50 an output request for reading data in a storage device (400). The request processing device 60 generates a corresponding internal command and puts it in the request queue 122. There is no data to map in the output request. The normalizer 70 reads the output request from the request queue 122, and generates using the storage address generator 152 a storage address indicating where that read data should be stored (410), as shown in FIG. 5. The address generator 152 uses the address database 154 for the storage address generation.

Based on the storage address, as shown in FIG. 6, the router 80 routes the normalized read request to an appropriate device (420) in a similar manner to the write request. When the requested data is stored in more than one device, it is preferable that the storage address indicates those data locations and the router 90 sends the read request to a device from which the requested data is most quickly available.

If the caching unit 90 is enabled for the storage address, as shown in FIG. 7B, the caching unit 90 receives the read request (210), and classifies the read request accordingly (212). The caching unit 90 then checks if the requested data is in the cache 202 (222). If it is in the cache, the caching unit 90 reads the data from the cache 202 (224).

If the requested data is not in the cache 202, then, the caching unit 90 sends the read request to the access unit 100 for reading the data from the storage device having the storage address (226).

The access unit 100 then accesses the storage device having the storage address, and reads the data (430).

Once the data is read, the caching unit 90 updates the cache 202 (228).

When the requested data is read (224, 228), the caching unit 90 returns the I/O status (216) with the requested data to the cache interface 200.

The data is then returned to the normalizer 70 shown in FIG. 5. If the data has been encrypted and/or compressed, the normalizer 70 decrypts and/or uncompresses the data using the encryption component 160 and the compression component 158.

Then, the I/O status and the requested data are sent to the host by the interface module 120 of the request processing unit 60 (138), as shown in FIG. 4.

The request processing unit 60 may also receive host requests 136 for static attribute information, such as capacity of the storage, the number of blocks transferred and the number of faults found. As shown in FIG. 4, it is preferable that the interface module 120 separates these host requests 154 from I/O requests, and responds to them using the information stored in the memory region 128. Also, it is preferable that, when a request relating to configuration of the apparatus is received, the request processing unit 60 separates it and routes it to the configuration control 110.

While particular embodiments of the present invention have been shown and described, changes and modifications may be made to such embodiments without departing from the true scope of the invention. For example, I/O requests represent writing and reading in the above embodiments. However, I/O requests may include other operations, such as moving, copying and deleting. The data storage managing apparatus 10 may move data in storage devices, i.e., change the physical address of data, without modification to the logical address of the data.

What is claimed is:

1. A data storage managing apparatus for managing data storage having multiple storage devices of various forms, the data storage managing apparatus comprising:

an access unit for configuring accessible multiple storage devices of various forms as a block of linear storage having storage addresses of a normalized format, each storage address indicating a specific location in a specific storage device, and for accessing the storage devices based on the storage addresses;

a request processing unit for receiving Input/Output (I/O) requests, each using a local protocol, and translating the I/O requests into translated requests in an internal protocol of the data storage managing apparatus, each I/O request having an original identification for requested data to be written or read, and the request processing unit having an interface module for generating logical addresses for the I/O requests based on their original identifications and tagging the I/O requests with the logical addresses to output the translated requests having logical addresses;

a normalizer for receiving the translated requests having the logical addresses, the normalizer having a storage address generator for generating storage addresses in the normalized format for the received translated requests, associating the storage addresses to the logical addresses, and adding the storage addresses to the translated requests to generate normalized requests; and a router for routing the normalized request to at least one of the multiple storage devices based on the storage address to access the data storage using the access unit.

2. The data storage managing apparatus as claimed in claim 1, wherein the request processing unit has an interface module which handles the local protocol.

3. The data storage managing apparatus as claimed in claim 1, wherein the request processing unit has multiple interface modules, one of which handles the local protocol.

4. The data storage managing apparatus as claimed in claim 1, wherein the request processing unit has a memory map for mapping the I/O request according to the local protocol.

5. The data storage managing apparatus as claimed in claim 1, wherein the request processing unit comprises:

multiple interface modules, each for handling its respective local protocol and for separating the I/O request into a command component and a data component, and generating an internal command based on the command component;

a request queue for queuing the internal command; and a memory map for mapping data in the data component according to the local protocol.

6. The data storage managing apparatus as claimed in claim 5, wherein the memory map has multiple memory regions, each memory region being assigned to one of the interface modules.

7. The data storage managing apparatus as claimed in claim 6, wherein each memory region has pre-allocated buffers and each buffer has an identification number.

8. The data storage managing apparatus as claimed in claim 5, wherein the processing unit interface tags the internal command with information regarding the memory mapping of the data.

9. The data storage managing apparatus as claimed in claim 8, wherein the normalizer has an interface for reading the internal command and the data using the information tagged on the internal command.

10. The data storage managing apparatus as claimed in claim 5, wherein the processing unit interface tags the internal command with a logical address that is defined from the local protocol.

11. The data storage managing apparatus as claimed in claim 10, wherein the normalizer further has an address database, and the storage address generator stores the storage address in the address database together with the logical address.

12. The data storage managing apparatus as claimed in claim 1, wherein the normalizer further has a modifying component for modifying the data.

13. The data storage managing apparatus as claimed in claim 12, wherein the modifying component is a buffering component for buffering the data.

14. The data storage managing apparatus as claimed in claim 12, wherein the modifying component is a compression component for compressing and uncompressing the data.

15. The data storage managing apparatus as claimed in claim 12, wherein the modifying component is an encryption component for encrypting and decrypting the data.

16. The data storage managing apparatus as claimed in claim 1, wherein the router further comprises a protocol converter for converting the internal protocol to an external protocol for routing the normalized request to an external device.

17. The data storage managing apparatus as claimed in claim 1, wherein the accessing unit presents the multiple accessible storage devices of various forms in the data storage as a block of linear storage represented by a block count having multiple blocks, each block corresponding to each storage device; and the storage address generator of the normalizer generates the storage addresses using addresses of the blocks.

18. The data storage managing apparatus as claimed in claim 1 further comprising a caching unit having a cache for caching the data.

19. A method for managing data storage having multiple storage devices of various forms, comprising the steps of:

configuring accessible storage devices of various forms as a block of linear storage having storage addresses of a normalized format, each storage address indicating a specific location in a specific storage device;

receiving by a data storage managing apparatus an Input/Output (I/O) request for writing or reading data to or from at least one of the multiple storage devices of the data storage, the I/O request being received using a local protocol, the I/O request having an original identification for requested data to be written or read;

translating the I/O request into a translated I/O request in an internal protocol of the data storage managing apparatus;

generating a logical address based on the original identification;

tagging the translated I/O request with the logical address;

generating a storage address in the normalized format for the received translated I/O request;

associating the storage address with the logical address;

normalizing by the data storage managing apparatus the translated request by adding the storage address to output a normalized request;

routing by the data storage managing apparatus the normalized request to the one of the multiple storage devices of the data storage based on the storage address; and accessing the one of the multiple storage devices of the data storage based on the storage address.

20. The method as claimed in claim 19, wherein the receiving step receives the I/O request using an interface module which handles the local protocol.

21. The method as claimed in claim 19, wherein the translating step is carried out by mapping the I/O request in a memory map according to the internal protocol.

22. The method as claimed in claim 19, wherein the translating step comprises the steps of:

separating the I/O request into a command component and a data component;

generating an internal command based on the command component;

putting the internal command in a request queue; and mapping data in the data component in a memory map according to the internal protocol.

23. The method as claimed in claim 22, wherein the translating step further comprises the step of tagging the internal command with information regarding the memory mapping of the data.

24. The method as claimed in claim 23, wherein the normalizing step reads the internal command and the data using the information tagged on the internal command.

25. The method as claimed in claim 22, wherein the translating step further comprises the step of tagging the internal command with a logical address that is defined from the local protocol.

26. The method as claimed in claim 25, wherein the normalizing step further comprises the step of storing the storage address in an address database together with the logical address.

27. The method as claimed in claim 19, wherein the normalizing step further has the step of modifying the data.

28. The method as claimed in claim 27, wherein the modifying step is the step of buffering the data.

29. The method as claimed in claim 27, wherein the modifying step is the step of compressing or uncompressing the data.

30. The method as claimed in claim 27, wherein the modifying step is the step of encrypting or decompressing the data.

31. The method as claimed in claim 19, wherein the routing step further comprises the step of converting the internal protocol to an external protocol for routing the normalized request to an external device.

32. The method as claimed in claim 19, wherein
the configuring step comprises the step of presenting the multiple accessible storage devices in the data storage as a block of linear storage represented by a block count having multiple blocks, each block corresponding to each storage device; and the storage address generating step generates the storage addresses using addresses of the blocks.

33. The method as claimed in claim 19 further comprising the step of caching the data in a caching unit, and wherein the routing step routes the normalized request to the caching unit.

* * * * *